June 7, 1949.  C. N. HICKMAN  2,472,108
THRUST GAUGE FOR PROJECTILES
Filed Nov. 16, 1944
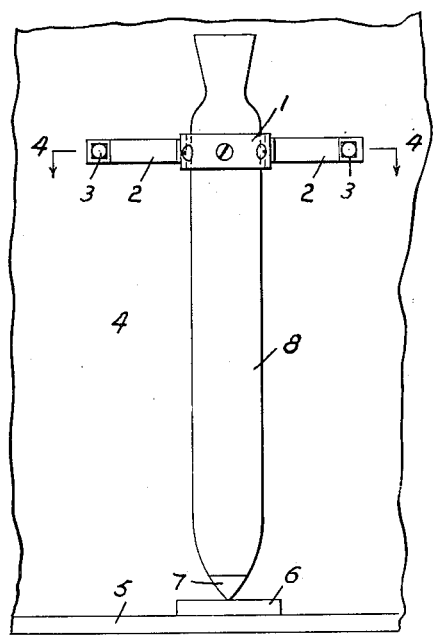
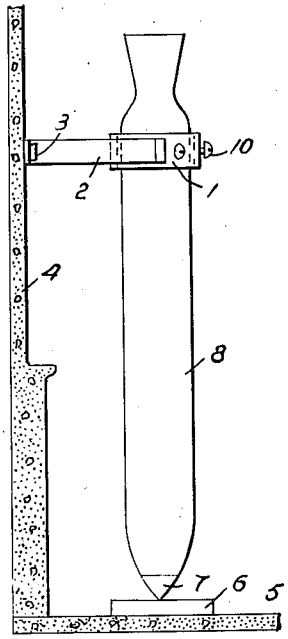
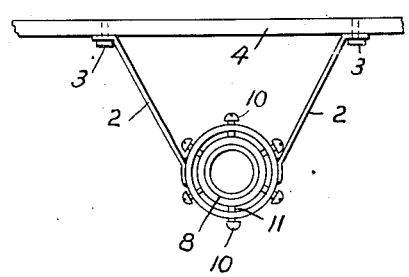
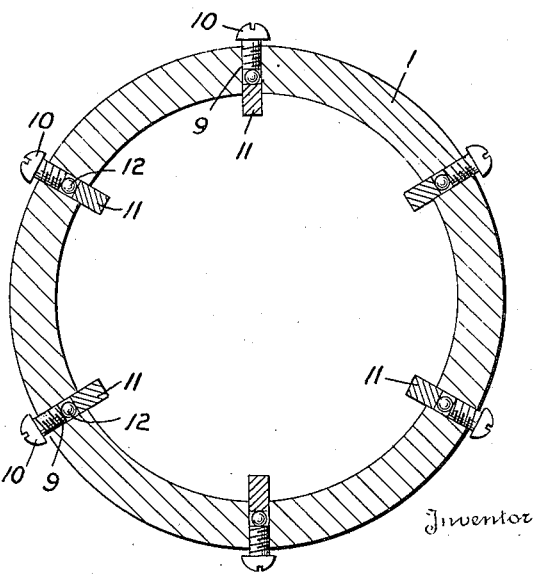
Inventor
Clarence N. Hickman
By C. E. Herrstrom & W. E. Thibodeau
Attorneys Patented June 7, 1949

2,472,108

UNITED STATES PATENT OFFICE 2,472,108

THRUST GAUGE FOR PROJECTILES

Clarence N. Hickman, Jackson Heights, N. Y., assignor to the United States of America as represented by the Secretary of War Application November 16, 1944, Serial No. 563,738

10 Claims. (Cl. 73—167)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a pressure or thrust gage, more particularly to a gage for determining the lateral thrust of rocket projectiles.

Determination of the lateral thrust of rocket projectiles has been particularly difficult since the stresses involved lie in a range below those for which the usual type of crusher gage is adapted and at the same time, above the applicable range of other usual types of gage available.

As is well known to those skilled in the ordnance art, the crusher type gage has been generally used for determination of chamber pressures in the study of ballistics. Attempts to apply it to the smaller stresses encountered in work, particularly those developed by rocket projectiles have not been successful, since the deformation of the copper cylinders has been too slight to provide significant and consistent data. The inadequacy of known types of gages is particularly evident when attempting to measure the lateral thrust developed by a rocket motor.

Accordingly it is an object of this invention to provide an improved pressure gage particularly adapted for determining the lateral thrust of rocket projectiles.

A particular object of this invention is to provide an improved crusher element for a force gage, particularly adapted to measurement of low values of applied stress.

The specific nature of this invention as well as other objects and advantages thereof, will clearly appear from a description of a preferred embodiment as shown in the accompanying drawings, in which:

Fig. 1 is a front elevation of the testing jig with a rocket projectile in place for test.

Fig. 2 is a side elevation as in Fig. 1.

Figure 3 is a plan view of the arrangement shown in Figure 1.

Figure 4 is a sectional view of the steel supporting ring alone, taken on line 4—4 of Figure 1, the supporting bracket 2 being omitted.

This invention consists of a steel supporting ring 1 preferably located in a horizontal plane and having integral projecting brackets 2 which are fastened by means of bolts 3 to a wall 4 or any other rigid support. Centrally below the ring 1 on a floor 5 is located an anvil 6 to support a nose 7 of the rocket projectile and absorb the thrust developed thereby. When in position for test the longitudinal axis of a body 8 of the rocket projectile is vertical and approximately coincident with the axis of the supporting ring 1.

The ring 1 is provided with a plurality, such as six, of radial holes 9, evenly spaced around the periphery in a plane perpendicular to the axis of the ring 1. An equal number of hardened adjusting screws 10 are threadably engaged in the outer portions of holes 9 and a hardened steel plunger 11 is slidably fitted within the inner portions of said holes. The ends of both the screws 10 and the plungers 11 are accurately finished to a smooth surface perpendicular to their axis. Between the screws 10 and the steel plungers 11 are located crusher elements, and, in accordance with this invention, such elements comprise an annealed copper sphere 12 of somewhat lesser diameter than the hole 9.

When the rocket projectile is placed in the assembly for testing, the nose 7 rests on the anvil 6 and is so positioned that when the cylindrical body 8 is centrally located in the ring 1 the longitudinal axis of the rocket body 8 is vertical. The supporting ring should be at a height close to the upper limit of the straight portion of the body 8 of the rocket projectile. The screws 10 are then adjusted so that all six plungers 11 just contact the periphery of the rocket body 8. Care must be used that no appreciable pressure is exerted by any of the screws 10 because of the danger of flattening the copper spheres 12 before the rocket is fired.

The copper spheres 12 should be prepared in the same manner as copper cylinders for the crusher type gage and carefully measured and if necessary sorted for uniformity of diameter. Several spheres from each lot should be subjected by means of a testing machine to pressures covering the range expected in the tests, and carefully measured across the flats to determine the relationship between pressure and distortion, thus providing a calibration table. The average deformation of several spheres tested at each pressure may be taken as the characteristic for the lot.

With the rocket projectile in position and the screws 10 properly adjusted, the rocket is ready to be fired, after which the screws 10 and the copper spheres 12 are removed. Upon discharge of the rocket projectile the energy of the longitudinal thrust is dissipated against the steel anvil 6.

The spheres 12 are measured across the flats and the lateral thrust of the rocket projectile for the corresponding angular direction is calculated therefrom. A slight deformation of all the spheres is likely to occur because of heat expansion of the rocket body 8. Hence it is advisable to subtract the minimum force measured from each of the others.

By utilizing annealed copper spheres instead of cylinders of the usual crusher type, accurately reproducible measurements have been obtained for the pressures encountered in measuring the lateral thrust of a rocket projectile. It is apparent from Fig. 4 that the sphere 12 is between two parallel plane surfaces, one on the screw 10 and the other on the plunger 11, hence the pressure and back pressure are diametrically opposite and applied without loss to the sphere. The resulting deformation of the sphere can be accurately measured by a micrometer or other thickness measuring device. It is furthermore apparent that a sphere will be deformed to a much greater extent than a cylinder of equal diameter when subjected to moderate pressure because of the limited area of application of the force, hence a relatively large deformation is obtained at relatively low values of stress.

It has been found that the deformation of the copper spheres is proportional to the force and with $5/32$ inch diameter spheres, a deformation of .001 inch corresponds to a force of about 12 pounds. Such crusher elements therefore provide an accurately reproducible measure of the lateral thrust of rocket projectiles, or any other application where low forces are involved.

I claim:

1. A pressure or thrust gage for determining the lateral thrust of a jet propelled device comprising in combination, a horizontally disposed supporting ring member fastened to a rigid support, an anvil member below said ring member, said ring member being provided with a plurality of evenly-spaced radial openings disposed in a plane substantially perpendicular to the axis of said ring member, an adjusting screw threadably engaged in each of said openings, a plunger slidably fitted in each of said openings, and a crusher element disposed within each of said openings between each of said adjusting screws and associated plungers, all adapted and arranged whereby a rocket projectile may be so disposed with the testing assembly that its nose part rests on said anvil member with a body part thereof centrally located in said ring member.

2. A construction as set forth in claim 1 with the adjacent faces of said screws and plungers being substantially smooth and perpendicular to their axes.

3. A pressure or thrust gage for determining the lateral thrust of a jet propelled device comprising in combination, a horizontally disposed supporting ring member fastened to a rigid support, a horizontally disposed anvil member below said ring member, said members having their vertical axes substantially coincidental and said ring member being provided with a plurality of evenly-spaced radial openings disposed in a plane substantially perpendicular to the axis of said ring member, an adjusting screw threadably engaged in the outer portion of each of said openings and a plunger slidably engaged in the inner portion of each of said openings, and a crusher element disposed within each of said openings between said adjusting screws and associated plungers, all adapted and arranged whereby a rocket projectile may be so disposed with the testing assembly that its nose rests on said anvil member and a portion of the body thereof is centrally located within said ring member.

4. A construction as set forth in claim 1 with each of said openings being within the same horizontal plane and the adjacent faces of said screws and plungers being substantially flat and smooth and in parallel vertical planes.

5. The combination in a force gage particularly adapted to measurement of low values of applied stress, of an annular member provided with a plurality of radial openings therein, a sphere of metallic material within each of said openings, and means for acting on said spheres when force is applied thereto, said means consisting of a plurality of pairs of members, one for each of said openings with the members of a pair at opposite sides of the sphere therein.

6. The combination in a force gage particularly adapted to measurement of low values of applied stress, of an annular member provided with a plurality of radial openings therein, a sphere of metallic material within each of said openings, and means for acting on said spheres when force is applied thereto, said means consisting of a plurality of pairs of members, one for each of said openings with the members of a pair at opposite sides of the sphere therein and the adjacent faces of the members of each of said pairs being flat and in substantial parallelism with one another.

7. A pressure or thrust gage for determining the lateral thrust of a jet propelled device comprising in combination, a horizontally disposed rigidly supported ring member, an anvil member below said ring member, said ring member being provided with a plurality of evenly-spaced radial openings disposed in a plane substantially perpendicular to the axis of said ring member, a metallic sphere disposed within each of said openings, and plunger members slidably disposed in said openings for acting on said spheres when force is applied thereto.

8. A structure as set forth in claim 7 with said plunger members consisting of a plurality of pairs of members, one for each of said openings with the members of a pair at opposite sides of the sphere therein.

9. A structure as set forth in claim 7 with said plunger members consisting of a plurality of pairs of members, one for each of said openings with the members of a pair at opposite sides of the sphere therein and the adjacent faces of the members of each of said pairs being flat and in substantial parallelism with one another.

10. A pressure or thrust gage for determining the lateral thrust of a jet propelled device comprising in combination, a horizontally disposed supporting ring member fastened to a rigid support, a horizontally disposed anvil member below said ring member, said members having their vertical axes substantially coincidental and said ring member being provided with a plurality of evenly-spaced radial openings disposed in a plane substantially perpendicular to the axis of said ring member, a sphere of metallic material disposed in the approximate central portion of each of said openings, an adjusting screw threadably engaged in the outer portion of each of said openings and a plunger slidably engaged in the inner portion of each of said openings at opposite sides of said spheres, all adapted and arranged whereby a rocket projectile may be so disposed with the testing assembly that its nose rests on said anvil member and a portion of the body thereof is centrally located within said ring member and whereby when the projectile is activated, force is applied to said spheres.

CLARENCE N. HICKMAN.

REFERENCES CITED

The following references are of record in the file of this patent:

UNITED STATES PATENTS

| Number | Name | Date |
| --- | --- | --- |
| 1,825,387 | Esnault-Pelterie | Sept. 29, 1931 |
| 2,362,484 | Hickman | Nov. 14, 1944 |

FOREIGN PATENTS

| Number | Country | Date |
| --- | --- | --- |
| 10,442 | Great Britain | 1898 |
| 174,968 | Germany | Sept. 29, 1906 |